Feb. 7, 1928.
C. F. FRANK
CHEESE SLICER
Filed Dec. 17, 1926
1,658,675
2 Sheets-Sheet 1
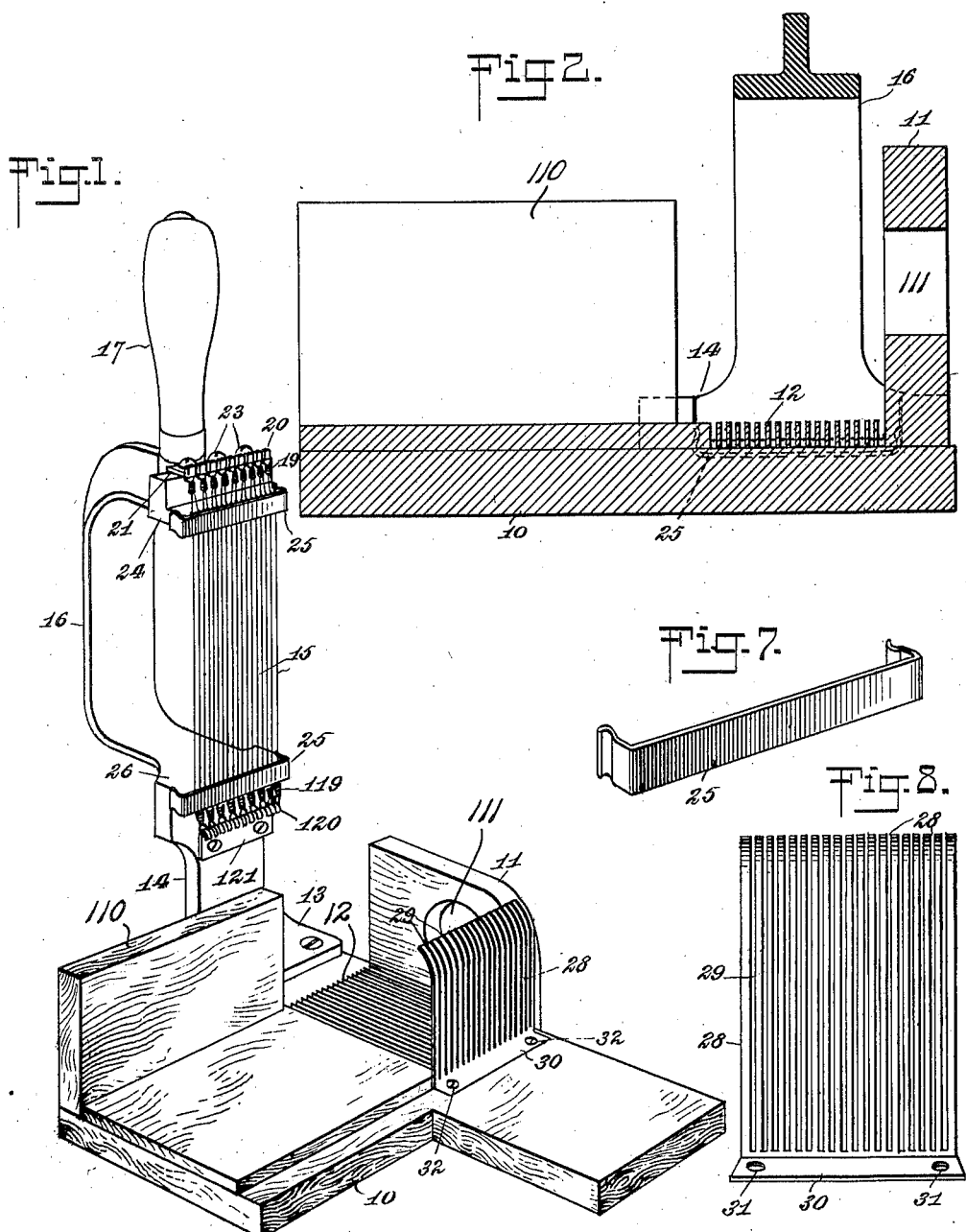
INVENTOR
*Charles F. Frank*
BY
ATTORNEY
WITNESSES Feb. 7, 1928.
C. F. FRANK
CHEESE SLICER
Filed Dec. 17, 1926
1,658,675
2 Sheets-Sheet 2
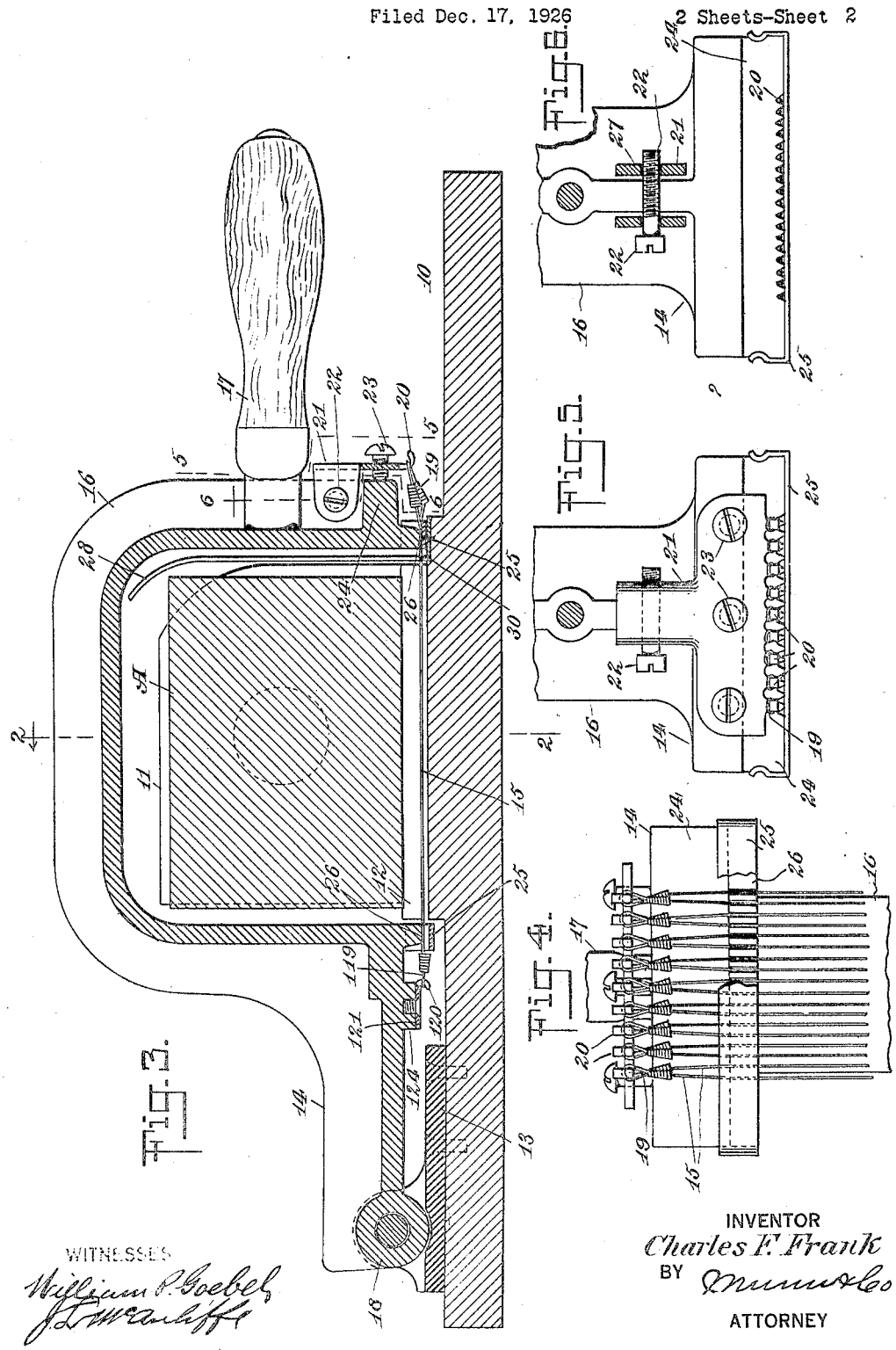
INVENTOR
*Charles F. Frank*
BY *Munn & Co*
ATTORNEY Patented Feb. 7, 1928.

1,658,675

UNITED STATES PATENT OFFICE.

CHARLES F. FRANK, OF BROOKLYN, NEW YORK.

CHEESE SLICER.

Application filed December 17, 1926. Serial No. 155,511.

My invention relates to a slicer for slicing loaf cheese and other material, said slicer having a special use in slicing cheese.

The general object of my invention is to provide a slicer in which the cutting means is in the form of a series of wires with which a convenient means is provided for tensioning the wires after having been placed in position and also to provide a construction whereby in the slicing movement the wires will be relieved of strain and all impact be received by rigid parts of the machine.

Reference is to be had to the accompanying drawings forming a part of this specification, it being understood that the drawings are merely illustrative of one example of the invention.

Figure 1 is a perspective view of a slicing device embodying my invention, the view showing the slicing cutter in the raised position;

Figure 2 is a transverse vertical section on the line 2—2 of Figure 3;

Figure 3 is a longitudinal vertical section;

Figure 4 is a fragmentary front view of the assemblage adjacent one end of the cutting wires, part being broken away;

Figure 5 is a section on the line 5—5 of Figure 3;

Figure 6 is a cross-section on the line 6—6 of Figure 3;

Figure 7 is a perspective view of one of the clamps applied to the machine and to be hereinafter referred to;

Figure 8 is an elevation of the guard and guide for the cutting wires.

In carrying out my invention in accordance with the illustrated example, a suitable table or base 10 is provided having at one end an upright member 11 forming a stop against which the cheese A or other material may be placed. In practice the hole 111 may be formed as shown in the member 11 to promote lightness. Said table 10 adjacent the stop member 11 has slits 12 between which enter the cutting wires 15 of the knife 14. Said knife is pivoted as at 18 to a base plate 13 and has a handle 17 as well as an arched portion 16 over the cutting wires. The wires 15 have at one end of the knife, loops 19 adapted to engage over hooks 20 on tension plate 21 pivoted at 22 to the knife 14 and having screws 23 bearing against a block 24. Turning of the screws 23 may relax or increase the tension on the cutting wires 15, as will be obvious. The opposite end of the wires 15 are similarly formed with loops 119 engaging over hooks 120 on a plate 121 suitably fastened to a bearing block 124. Numeral 110 indicates the side guide on the base 10.

With the described construction the knife 14 is raised to a perpendicular position as indicated at Figure 1 and the cheese loaf A or other material is placed on the base 10 and advanced, when it is desired to cut it, to a position with an end adjacent to the stop member 11 and therefore having a portion of the cheese above the slits 12. The knife is then lowered, causing the cutting wires 15 to pass through the cheese and forming the same into regular, clean-cut slices.

In placing the wires 15 on the hooks 20 or in replacing one or more broken wires I provide means to retain the wires on the hooks 20 and 120 until the wires have been tensioned by screws 23 and plate 21. For the purpose indicated use is made of clamps 25 adapted to be disposed transversely across the wires 15 near each end and engage with suitable members 26 on the knife 14 adjacent the plates 21, 121. The clamps 25 are attachable to and detachable from the members 26 so that they can be used in replacing the wires and to hold the wires until tensioned.

That clamp 25 adjacent to the handled end of the knife 14 has a double function, because in addition to serving as a retainer for the wires 15 at that end, said clamp constitutes a shoe on the knife 14 to receive the impact against the table 10 when the knife is lowered, as will be clear from an inspection of Figure 3. Thus, with the contact of the outer shoe 25 against the table or base 10 the wires 15 are relieved of all strain in the cutting operation, as said shoe 25 arrests the downward movement of the knife before wires 15 contact with the table or base 10.

In order to prevent irregularity in the cutting action of the wires 15 and to constrain them to take definite, straight paths when functioning, I provide a guard or guide designated generally by the numeral 28, which is formed with a series of blades, thereby producing spaces 29 for receiving the wires 15, as the knife 14 is moved downwardly in the cutting action. Said element 28 is secured in any suitable manner, there being employed for the purpose in the present example a base flange 30 having holes 31 adapted to receive fastening screws 32 that hold the element to the base 10. The upper ends of the blades of element 28 are deflected laterally inward on curved lines, so that the wires 15 enter the spaces 29 approximately at the time said wires 15 cut into the cheese A or other material.

I would state furthermore that while the illustrated example constitutes a practical embodiment of my invention I do not limit myself strictly to the exact details herein illustrated, since, manifestly, the same can be considerably varied without departure from the spirit of the invention, as defined in the appended claims.

What I claim is:

1. A device of the class described including a table, a cutter pivoted to said table to swing vertically, cutting wires disposed on said cutter and tensioning means for said wires; together with detachable elements on said cutter to hold the wires until tensioned, said detachable elements having resilient bent ends adapted to spring into and out of engagement with the cutter.

2. A device of the class described including a vertically movable cutter, a plurality of cutting wires on said cutter, and a resilient clamp extending transversely across the wires and detachably engaged with said cutter at the ends of said clamp.

CHARLES F. FRANK.